Patented Dec. 20, 1938

2,140,527

UNITED STATES PATENT OFFICE 2,140,527

COMPOSITION OF MATTER

Charles R. Haynes, Clinton, Conn., Weaver R. Clayton, New York, N. Y., and Robert V. Townend, Arlington, N. J., assignors to William Zinsser & Co., New York, N. Y., a corporation of New York No Drawing. Application December 29, 1936, Serial No. 118,084

10 Claims. (Cl. 18—48)

Our present invention relates to a composition of matter comprising vulcanized rubber and shellac, and to a process of making the same.

Many compositions comprising vulcanized rubber or caoutchouc and shellac have been proposed. The addition of shellac to rubber compositions offers obstacles, however, if a vulcanized soft rubber is to be obtained, due to the fact that shellac has a tendency to retard vulcanization and, therefore, requires a long continued heating at a high temperature which tends to impair the quality of the resulting rubber composition. Shellac also counteracts or nullifies the action of certain types of accelerators, and the use of an accelerator in shellac and rubber compositions may, therefore, fail to overcome resistance to vulcanization caused by the presence of the shellac.

Our present invention provides a process in which a mixture comprising rubber and shellac may be vulcanized under selected conditions by the use of a selected type of accelerator.

In our invention a vulcanizable composition is made of rubber and shellac with appropriate fillers and compounding ingredients, while avoiding any substantial alkalinity in the mixture or inclusion of any reactive or water soluble alkaline or basic materials. An acidic or non-basic accelerator is also compounded into the composition. The use of an alkaline or basic accelerator is to be avoided, except that a small quantity of a basic accelerator may be included with a relatively large quantity of an acidic accelerator when the action of one does not interfere with that of the other and where the mixture remains substantially acidic in character. Sufficient sulphur is included to provide for the vulcanization of the rubber, and a small additional quantity is beneficial in its action on the shellac. The various ingredients may be compounded in the rubber in any suitable manner, care being taken to avoid the simultaneous addition of sulphur and accelerators under such conditions as would give a local concentration of both in the materials being compounded. For example, the accelerator and shellac may be compounded with the rubber and fillers, or other compounding ingredients, and when a thorough mixture is obtained the sulphur may be incorporated or, the batch may be divided, one-half being mixed with an accelerator and the other with sulphur, and then the two compounded together.

The resulting mixture may then be molded, extruded, spread or otherwise shaped to the desired form and vulcanized or cured at a temperature and for a time depending upon the activity of the accelerator employed and the degree of vulcanization required. For example, in an ordinary mix using a rapid accelerator, a cure of 15 minutes may be sufficient.

Any suitable rubber may be employed provided it is free, or substantially free, from alkali or alkaline reacting materials. For example, if a reclaim rubber is used that has been treated with alkalies, such alkalies must be removed or neutralized before compounding with the shellac and accelerators. Solid inert compounding ingredients, such as zinc oxide or other inert oxides, may be employed even though chemically basic inasmuch as they are substantially insoluble and inert under conditions of compounding and vulcanizing. Other compounding ingredients which are neutral or slightly acidic in character, for example carbon black, may also be employed. Any suitable acid or non-basic accelerator may be employed as, for example, captax (mercaptobenzothiazole), altax, tuads, butyl zimate (zinc di-butyl dithiocarbamate), zimate, or 552.

An example of a suitable mixture is the following:

| | Parts |
|---|---|
| Rubber | 100 |
| Zinc oxide | 5 |
| Whiting | 50 |
| Carbon black | 3 |
| Captax | 1 |
| Stearic acid | 1 |
| Neozone D | 1 |
| Sulphur | 3 |
| Shellac | 10–20 |

In compounding the above mixture, the various ingredients, with the exception of the sulphur, may be mixed and compounded in a Banbury or other suitable mixer until thoroughly incorporated, whereupon the sulphur may be added and the mixing continued until it is thoroughly incorporated in and disseminated throughout the composition.

In compounding the various ingredients, the normal heat of mixing is sufficient to soften the shellac so that it mixes in thoroughly and easily. The shellac may be added at the start of the mixing or after the fillers have been added. The shellac disperses throughout the rubber more easily than the fillers. An additional quantity of sulphur equal to between 3% and 5% of the weight of the shellac may be added to the mixture and appears to give somewhat better results.

It will be understood that the proportions of the various ingredients may be varied and other ingredients substituted provided the batch is not made alkaline.

The addition of the shellac to the rubber and subsequent vulcanization imparts desirable properties to the rubber. It increases the tensile strength very considerably and improves the aging qualities. The hardness and toughness of the resulting vulcanized rubber composition are also increased. The vulcanized rubber shellac composition also is somewhat more resistant to the action of oils and similar solvents. The electric insulating properties of the rubber composition is greatly increased by the addition of the shellac. The unvulcanized mixture is tacky when hot which enables the surfaces of the stock to be readily united, but stiffens when cold sufficiently to enable it to be readily handled. The hot stock extrudes freely from a tube or extruding machine, the shellac acting as a lubricant while hot, and stiffening the composition when cold. The composition remains elastic after vulcanization, although harder and tougher than the corresponding rubber composition.

The term "shellac" is understood to include the various kinds of lac resin, such as native-made, machine-made, dewaxed, or bleached shellac, button lac, seedlac, or sticklac. The preferred type is a high grade machine-made shellac such as beta or delta shellac, on account of its uniformity, cleanliness and special free flowing qualities.

What we claim is:

1. A process of forming a vulcanized rubber and shellac composition which comprises mixing together shellac, a low temperature, non-alkaline accelerator and a vulcanizable rubber composition free from water soluble alkalies, and vulcanizing the resulting mixture.

2. A process of forming a vulcanized rubber and shellac composition which comprises mixing shellac into a rubber composition free from water soluble alkalies, adding thereto and admixing therein a non-basic accelerator, and vulcanizing the resulting compound.

3. A process of forming a vulcanized rubber and shellac composition which comprises mixing shellac with a vulcanizable rubber mixture comprising rubber, sulphur and zinc oxide but free from water soluble alkali, admixing a non-basic accelerator into said mixture, shaping the resulting composition, and vulcanizing it.

4. A process of forming a vulcanized rubber and shellac composition which comprises neutralizing any alkalinity in said rubber, mixing shellac with said neutralized rubber, admixing a non-basic accelerator into said mixture and vulcanizing the resulting composition.

5. A process of forming a vulcanized rubber and shellac composition which comprises treating said rubber to remove all water soluble alkalies therefrom, admixing said treated rubber with shellac and zinc oxide and sulphur and with a non-alkaline accelerator and vulcanizing said mixture.

6. A vulcanized mixture of shellac and rubber free from water soluble alkalies and having a small quantity of a non-alkaline accelerator.

7. A vulcanized mixture of shellac, zinc oxide and non-alkaline accelerator and rubber free from water soluble alkalies.

8. A vulcanizable composition comprising shellac rubber free from water soluble alkalies, sulphur, zinc oxide and a non-alkaline accelerator.

9. A vulcanizable composition comprising shellac rubber free from water soluble alkalies, sulphur and a non-alkaline accelerator.

10. A process of forming a vulcanized rubber and shellac composition which comprises mixing together shellac, a vulcanizable rubber composition free from water soluble alkalies, and an acidic mixture of alkaline and acid accelerators, and vulcanizing the resulting composition.

CHARLES R. HAYNES.
WEAVER R. CLAYTON.
ROBERT V. TOWNEND.